United States Patent [19]

Reiney

[11] Patent Number: 4,527,272
[45] Date of Patent: Jul. 2, 1985

[54] SIGNATURE ANALYSIS USING RANDOM PROBING AND SIGNATURE MEMORY

[75] Inventor: Michael G. Reiney, Tigard, Oreg.
[73] Assignee: Tektronix, Inc., Beaverton, Oreg.
[21] Appl. No.: 446,907
[22] Filed: Dec. 6, 1982
[51] Int. Cl.³ .................... G01R 31/28; G06F 11/00
[52] U.S. Cl. .......................................... 371/25; 371/26
[58] Field of Search ........................... 371/10, 25, 26; 324/73 R

[56] References Cited

U.S. PATENT DOCUMENTS

| | | | |
|---|---|---|---|
| 4,058,851 | 12/1977 | Scheuneman | 371/10 X |
| 4,099,668 | 7/1978 | Feilchenfeld et al. | 324/73 R X |
| 4,194,113 | 3/1980 | Fulks et al. | 371/25 X |
| 4,312,067 | 1/1982 | Shirasaka | 371/25 |
| 4,385,385 | 5/1983 | Duplessis et al. | 371/25 |

Primary Examiner—Jerry Smith
Assistant Examiner—Mark Ungerman
Attorney, Agent, or Firm—Allston L. Jones; John P. Dellett

[57] ABSTRACT

A circuit test system using signature analysis allows random probing to detect faults in an assembly under test. Test points on a properly working assembly are probed at random and the signatures obtained are listed in a memory or storage media. Thereafter, when testing other boards these same test points are probed randomly and the signatures are compared to the list of possible good signatures. If a match is found a "pass" indication is generated and the operator tests another node. If a match is not found, a "failure" indication is generated and more detailed troubleshooting of circuits at that test node commences.

5 Claims, 1 Drawing Figure

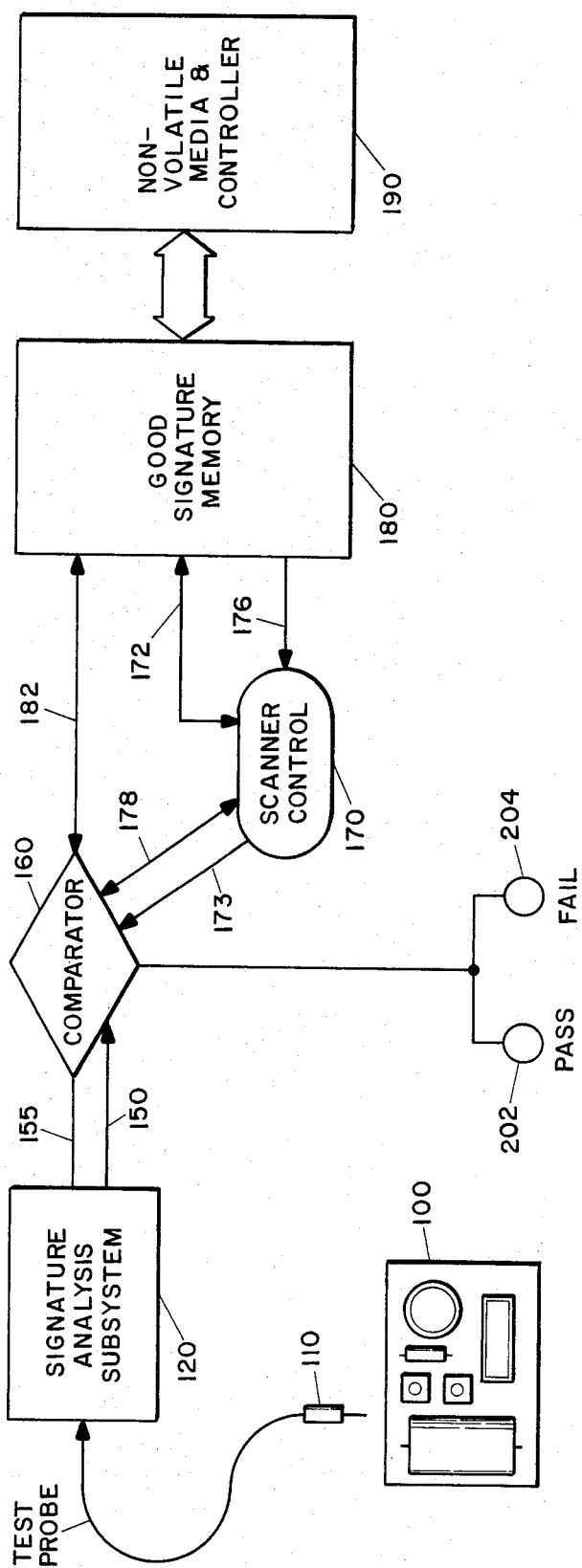

SIGNATURE ANALYSIS USING RANDOM PROBING AND SIGNATURE MEMORY

BACKGROUND & SUMMARY OF THE INVENTION

Signature analysis is a circuit test method which generates a nearly unique data code or signature at a circuit node with the electrical signal at that node modifying a pseudo random sequence during a selected period of time. See, for example, U.S. Pat. No. 3,976,864 issued on Aug. 24, 1976 to Gordon et al.

Previous use of signature analysis test systems has required the operator to determine which node to test, obtain a signature from that node, and then compare the signature obtained to the expected value for that node. The operator had to keep track of the nodes tested and perform the various clerical tasks necessary, such as, matching up the designation of the node on the schematic and the assembly under test, determining the signature of the specific node under test, and then comparing the signature actually obtained with the one that should have been obtained at that node. On large assemblies particularly, this clerical overhead increases probability of operator error.

Some previous systems have attempted to reduce this clerical overhead by using "guided test probe" techniques. These techniques require the operator to strictly follow a preset sequence. They also have the disadvantage that the operator must follow the predetermined guided test node sequence and therefore cannot follow his suspicions and test the board areas in the order he feels they are most likely to contain the faulty component in view of the indicated symptoms placed on the repair tag by field service or assembly line personnel.

In accordance with the preferred embodiment of the present invention, a circuit test system using signature analysis techniques contains a list of acceptable signatures which could be obtained from a corresponding assembly if it was in proper working condition. During testing of an assembly, the operator randomly probes test nodes of the assembly to obtain signatures. Once the signature is obtained, the system searches through the list to see if a match can be found between the signature obtained from the assembly under test and those in the list. If a match is found, a pass indication is provided. Correspondingly, if no match if found, a fault indication is provided.

The probability that the signature for a fault node might match with the good signature for another node is quite low. The possibility that a bad board could completely test good is further lessened when one realizes that errors propagate through a circuit and there would typically be several bad signatures on a malfunctioning board.

DESCRIPTION OF THE DRAWING

The FIGURE is a block diagram of a system in accordance with the preferred embodiment.

DESCRIPTION OF THE PREFERRED EMBODIMENT

Referring now to the FIGURE, there is shown a diagram of a system in accordance with the preferred embodiment. An assembly 100 under test is probed by an operator to randomly obtain signatures from circuit nodes of assembly 100. The operator uses signature analysis subsystem 120 with test probe 110 to obtain signatures from circuit nodes on assembly 100.

Upon obtaining a signature from assembly 100, comparator 160 receives the signal on line 150 indicating that a search through good signature memory 180 should be made to determine if a match can be found between the signature obtained and those present in good signature memory 180. It should be noted that when the operator first decided to test assembly 100, he first accomplished the necessary steps to download the appropriate set of good signatures from storage media and controller 190 into good signature memory 180. Storage media 190 has previously been loaded with all the good signatures for assembly 100 and all other assemblies which will be tested on the system. It should also be noted that the good signatures for any assembly 100 can be loaded into storage media and controller 190 by either of two methods. The first method, the prior art method, which might be utilized is to load a previously determined signature table for the assembly under test. The second method, the method of the instant invention, is for the operator to take a properly working assembly of the type to be tested and to randomly probe the test points thereon, and storing the signatures obtained at each test point into storage media and controller 190.

Upon obtaining the signature on line 155 as indicated by the signal on line 150, scanner control 170 causes good signature memory 180 to sequentially read each signature contained therein onto line 182. The presentation of each signature on line 182 is initiated by the signal on 172. Scanner control 170 generates the signal on line 178 in response to the signal on line 172. Comparator 160 compares the signature received on line 155 with the signature received on line 182. If the two signatures are the same, the pass signal is generated on line 167 and the pass indicator 202 is activated. Also, once a match is found between the signature received on line 155 and one of the signatures in good signature memory 180, the search for match is ended and the pass indicator remains activated. The operator then proceeds to obtain another signature from a different circuit node selected at random.

However, if no match is found between the signature received on line 155 and the signatures in good signature memory 180, then the fail signal is generated on line 167 and the fail indicator 204 is activated and the operator tests the circuit nodes which provide signals to the node where the fail condition is generated. Scanner control 170 knows when the last signature has been read from good signature memory 180 since it monitors the end of memory signal on line 176. The scanner control 170 causes comparator 160 to generate the pass or fail signal on line 167 in reponse to the finding of a match or not, respectively, between the signal on line 167 in reponse to the finding of a match or not, respectively, between the signature on line 155 and the last signature provided on line 162 from good signature memory 180.

I claim:

1. A method for testing an electronics assembly using an electronic tester, said method comprising the steps of:

providing a set of data codes representing acceptable responses at a plurality of predetermined test points for testing stimulus signals provided to an operable electronic assembly of the type under test;

generating a first data code in response to a testing operation on one of said plurality of predetermined test points in said electronic assembly under test;

comparing said first data code to said set of data codes to determine if an equivalent data code is contained therein; and providing a test result indication in response to the comparison of said first data code to said set of data codes.

2. A method as in claim 1 wherein the step of comparing data codes includes the steps of:

scanning each of the codes of the set of data codes;

comparing each of the scanned codes with said first data code; and discontinuing the scanning of the set of said data codes upon the matching of said first data code with one of the codes of said set of data codes.

3. A method as in claim 2 wherein the step of providing a test result indication includes the steps of:

generating a fail indication if all of the sets of the data codes are compared with the first data code without a match being found; and generating a pass indication if a match is found for the first data code among the set of data codes.

4. A method as in claim 1 wherein the step of providing a set of data codes representing acceptable responses includes the steps of:

reading a set of data codes at predetermined test points on a known electronic assembly of the type under test; and storing the data codes generated from a known operable electronic assembly of the type under test in the electronic tester.

5. A method as in claim 4 wherein the step of reading a set of data codes includes the steps of:

randomly sampling the stimulus signals at predetermined test points on a known operable electronic assembly of the type under test; and generating a set of data codes in response to the randomly sampled stimulus signals of the known operable electronic assembly.

* * * * *